United States Patent [19]

Komatsu

[11] 3,759,558
[45] Sept. 18, 1973

[54] FLUID SHOCK ABSORBING BUMPER
[75] Inventor: Koichi Komatsu, Tokyo, Japan
[73] Assignee: Atsugi Motor Parts Co., Ltd., Atsugi City, Japan
[22] Filed: Dec. 27, 1971
[21] Appl. No.: 212,494

[30] Foreign Application Priority Data
Dec. 29, 1970 Japan............................ 45/120672

[52] U.S. Cl...................... 293/30, 213/8 A, 293/70
[51] Int. Cl. ... B60r 19/02, B61f 19/04, B61g 11/12
[58] Field of Search ................... 293/30, 70, 85, 86; 213/8 A, 8 R

[56] References Cited
UNITED STATES PATENTS
| 2,600,060 | 6/1952 | Lopes et al. | 293/85 |
| 1,621,501 | 3/1927 | Floto | 293/30 |
| 1,375,574 | 4/1921 | Dodson | 293/30 |
| 3,096,116 | 7/1963 | Kost | 293/85 |
| 3,226,146 | 12/1965 | Behr | 293/70 X |
| 3,333,880 | 8/1967 | Tavano, Sr. | 293/85 X |
| 1,772,162 | 8/1930 | Smith | 105/364 |
| 2,590,406 | 3/1952 | Haas | 218/8 A |

FOREIGN PATENTS OR APPLICATIONS
267,209   3/1927   Great Britain....................... 293/30

Primary Examiner—Gerald M. Forlenza
Assistant Examiner—Howard Beltran
Attorney—Eric H. Waters et al.

[57] ABSTRACT

A shock absorbing device for vehicles which includes a front bumper, a rear bumper, a link rod means connecting said front and rear bumpers, and a pair of hydraulic damper means inserted between each end of the link rod means and the corresponding bumper, respectively. Upon application of a shock to one of the bumpers, both the shocked bumper and the link rod means move toward the other bumper, so as to simultaneously actuate said pair of hydraulic damper means. As a result, the apparent bumper stroke is doubled, as compared with that of single damper shock absorber, without increasing the distance between the two bumpers.

2 Claims, 3 Drawing Figures

PATENTED SEP 18 1973 3,759,558

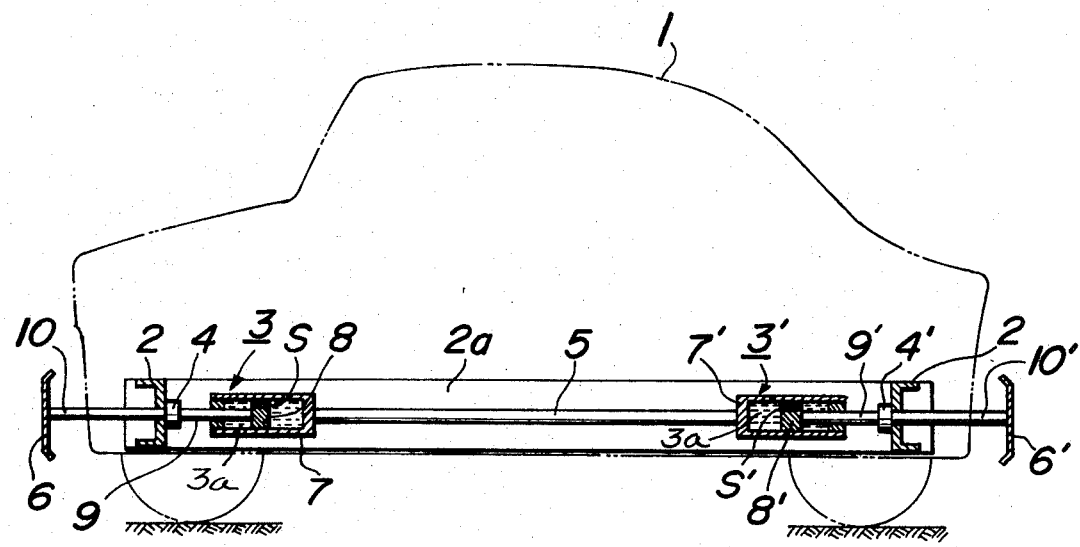
FIG_3

FLUID SHOCK ABSORBING BUMPER

BACKGROUND OF THE INVENTION

1. Field of the Invention

This invention relates to a shock absorbing device for vehicles, and more particularly to a shock absorbing device for vehicles comprising a front bumper, a rear bumper, a link rod means connecting said front and rear bumpers, and a pair of hydraulic damper means inserted between each end of the link rod means and the corresponding bumper, respectively.

2. Description of the Prior Art

Generally speaking, the impact energy dissipated by collision of two matters is proportional to the square of the moving velocity of the matter or matters at the moment of the collision. When bumpers are used in a vehicle for absorbing the impact energy in the case of its collision, the reaction force generated in the vehicle increases with the vehicular velocity at the moment of the collision. On the other hand, the mechanical strength of the bumper per se must be coordinated with the strength of other parts of the vehicle, so that there is a limit in the strength of the bumper.

To increase the energy absorbing capacity of the bumper, the deformation stroke of the bumper may be designed to be large. The overall dimension requirement of the vehicle, however, acts to restrict the deformation stroke of the bumper within a certain limit.

An object of the present invention is to improve the energy absorbing capacity of bumpers without increasing the reaction force thereof, by interconnecting front and rear bumpers of a vehicle through a pair of hydraulic dampers, so as to increase the effective deformation stroke of the bumpers.

There are several proposals for interconnecting the front and rear bumpers. For instance, U.S. Pat. No. 3,226,146, which was granted to William F. Behr on Dec. 28, 1965, discloses the interconnection of front and rear bumpers of a vehicle by elongated cylinders, each having springs and hydraulic chambers for absorbing shock energy. The Behr structure, however, does not co-ordinate the actions of the front and rear bumpers, so that each bumper acts quite independently of the other bumper. U.S. Pat. No. 3,333,880, which was granted to Joseph V. Tavano, Sr. on Aug. 1, 1967, discloses a rigid interconnection of front and rear bumpers of a vehicle by means of solid rods. Accordingly, with the Tavano structure, the front and rear bumpers move together, but there is no relative motion between the front and the rear bumpers.

Therefore, an object of the present invention is to improve the shock abosrbing capacity of vehicular bumpers by providing a structure in which any impact applied to one vehicle bumper is absorbed both by the front and rear bumpers.

SUMMARY OF THE INVENTION

According to the present invention, the front and rear bumpers of a vehicle are interconnected by a link rod means, preferably two parallel link rods. A hydraulic damper means is provided between each end of the link rod means and the corresponding bumper. The hydraulic damper means preferably comprises two dampers each including a closed cylinder rigidly secured to the bumper and a piston slidably placed in the cylinder and rigidly connected to one end of the link rod. The damper cylinder is sealingly filled with a fluid, and the movement of the piston in the damper cylinder causes damping action. Each hydraulic damper is held by the chassis of the vehicle in such a manner that the damper cylinder is movable toward the inside of the vehicle or toward the hydraulic damper at the opposite end of the link rod means, but not toward the outside of the vehicle. Thus, an impact on either front or the rear bumper is borne by all the hydraulic dampers rigidly secured to the front bumper and the rear bumper, so as to greatly improve the shock absorbing capacity of the bumpers.

BRIEF DESCRIPTION OF THE DRAWING

For a better understanding of the invention, reference is made to the accompanying drawings, in which:

FIG. 3 is a schematic vertical sectional view of another shock absorbing device according to the present invention.

Like parts are designated by like numerals and symbols througout the drawings.

DESCRIPTION OF THE PREFERRED EMBODIMENT

Figure 1:
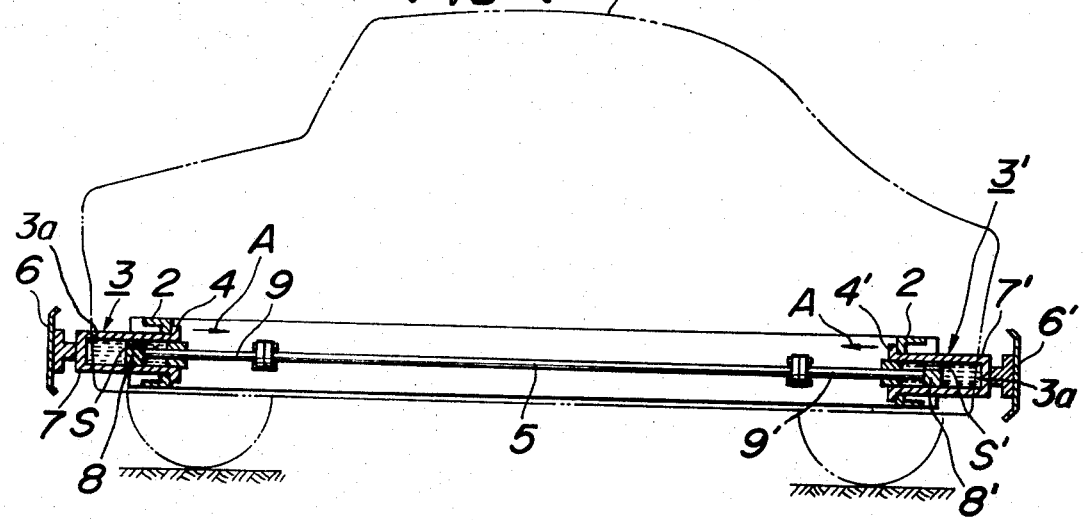
FIG. 1 is a schematic vertical sectional view of a shock absorbing device according to the present invention.
Figure 2:
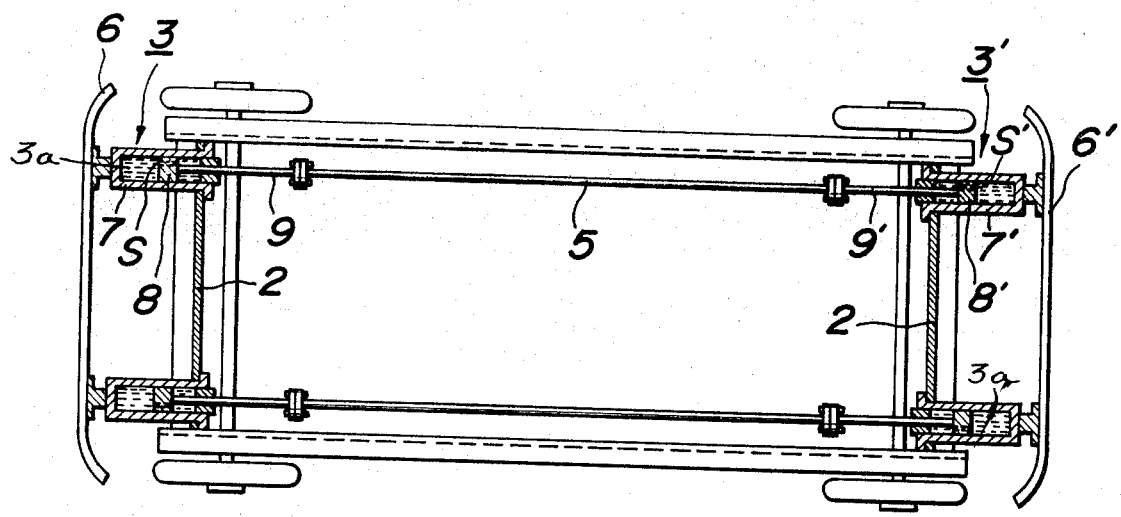
FIG. 2 is a schematic plan view of the shock absorbing device of FIG. 1.

Referring to FIGS. 1 and 2, the chassis 2 of a vehicle body 1 carries a front hydraulic damper means 3 and a rear hydraulic damper means 3' at the front and rear ends thereof, respectively. Each hydraulic damper means 3 or 3' comprises at least one damper including a closed hydraulic cylinder 7, 7', a piston 8, 8' slidably disposed in the cylinder, a fluid sealingly filled in the cylinder, a piston rod 9, 9' integrally secured to the piston, and an outwardly extending flange 4, 4' formed integral with the cylinder at one end thereof. The flanges 4 and 4' engage the chassis 2 in such a manner that each hydraulic damper can move toward the inside of the vehicle, as shown by arrows A of FIG. 1, but not toward the outside thereof.

The cylinders 7, 7' of the hydraulic damper means 3, 3' are rigidly secured to the front and rear bumpers 6, 6', respectively. The piston rods 9, 9' of the hydraulic damper means 3, 3' are connected to the opposite ends of a link rod means 5, e.g., two solid rods, by suitable joint means, as shown in FIGS. 1 and 2.

In another embodiment of the invention, as shown in FIG. 3, cylinders 7, 7' of two hydraulic damper means 3, 3' are rigidly connected to the opposite ends of a link rod means 5, while piston rods 9, 9' of the hydraulic damper means 3, 3' are connected to stems 10, 10' of front and rear bumpers 6, 6', respectively. The piston rods 9, 9' are secured to pistons 8, 8' slidably disposed in the cylinders 7, 7', respectively. The stems 10, 10' are rigidly secured to the bumpers 6, 6' at one ends thereof, while flanges 4, 4' are secured to the opposite ends of the stems 10, 10', so as to inhibit the outward movement of the dampers in excess of the chassis 2 of the vehicle.

In either of the embodiments of FIGS. 1 and 2 and FIG. 3, a compressible fluid $3a$ with a high compression rate, e.g., silicone oil, is filled in the hydraulic cylinder 7, 7'. Each piston 8, 8' has a controllable orifice $s$, $s'$, through which the hydraulic fluid communicates between two chambers formed in the cylinder 7, 7' by the piston 8, 8' acting as a movable partition wall.

In operation, let it be assumed that an impact toward the vehicle is applied to the front bumper 6 of FIG. 1. The cylinder 7 is pushed toward the inside of the vehicle, to increase the fluid pressure in the chamber to the left of the piston 8. By virtue of the controllable orifice $s$, the piston 8 is allowed to move to the right in response to the pressure rise in the left-hand side chamber of the cylinder 7, while partially damping the impact by the fluid flow resistance at the orifice $s$. Thus, the link rod means 5 moves to the right. In the case of the embodiment of FIG. 3, a rightward shock to the front bumper 6 is transmitted to the piston rod 9, the cylinder 7, and the link rod means 5, while partially damping the shock by the controllable orifice $s$ of the front damper means 3. In either of the two embodiments, the rear end of the link rod means 5 causes a relative movement between the cylinder 7' and the piston 8', so that the resistance to the fluid flow through the controllable orifice $s'$ of the piston 8' further damps the impact applied to the front bumper 6.

Any impact applied to the rear bumper 6' toward the vehicle can be absorbed in the similar fashion by the two hydraulic damper means 3 and 3'. In this case, the hydraulic damper means 3' reacts first for partial damping, and transmits the impact to the other hydraulic damper means 3 for further damping.

To compensate for the volume of that portion of the piston rod 9, 9' which is located within the cylinder 7, 7', the fluid to be filled in the cylinder 7, 7' should preferably be compressible. Instead, a compressible air balloon (not shown) may be disposed within the cylinder 7, 7', or a separate fluid reservoir (not shown) may be connected to the cylinders 7, 7' for such compensation, as well known to those skilled in the art.

Upon removal of the impact load from the bumper 6 or 6', the pistons 8, 8' of the hydraulic damper means 3, 3' are forced to their original position in the cylinders 7, 7' due to a force differential across the piston, so that the link rod means 5 is forced to its original position for causing all the flanges 4, 4' to engage the chassis 2. Thus, the shock absorbing device becomes ready for next operation.

As described in the foregoing disclosure, according to the present invention, two hydraulic damper means 3, 3' at the front and rear ends of a vehicle are simultaneously actuated, in response to an impact to either of front and rear bumpers 6, 6'. Accordingly, the sum of the two strokes representing the operation of the two damper means constitutes the stroke of one bumper 6 or 6' to which the impact is applied. In other words, the apparent deformation stroke of each bumper is doubled, as compared with that of conventional devices. Therefore, the shock absorbing capacity of the device is greatly improved.

What is claimed is:

1. A shock absorbing device for a vehicle having a chassis, a front bumper, and a rear bumper, comprising at least one front hydraulic damper means each consisting of at least one damper including a cylinder, a piston with an orifice slidably fitted in the cylinder, a fluid sealingly filled in the cylinder, and a piston rod integrally secured to the piston at one end thereof; at least one rear hydraulic damper means each consisting of at least one damper including a cylinder, a piston with an orifice slidably fitted in the cylinder, a fluid sealingly filled in the cylinder, and a piston rod integrally secured to the piston at one end thereof; a plurality of pairs of restrictive flange means secured to said chassis, each pair of the restrictive flange means slidably holding one of said front and one of said rear hydraulic damper means while allowing the two damper means to move toward each other but to prohibit the two damper means to move away from each other in excess of said vehicle chassis; and a plurality of link rod means rigidly connecting said front and rear damper means, one of the cylinder and the piston rod of each front damper means being connected to said front bumper while being slidably held by said restrictive flange means, one of the cylinder and the piston of each rear damper means being connected to said rear bumper while being slidably held by said restrictive flange means, the remaining one of the cylinder and the piston rod of each front damper means being rigidly connected to the remaining one of the cylinder and the piston rod of the corresponding rear damper means by one of said link rod means.

2. A shock absorbing device according to claim 1, wherein the inside of the cylinder of each of said front and rear hydraulic damper means is filled with silicone oil.

* * * * *